United States Patent
Ashman, Jr.

(10) Patent No.: US 7,536,200 B2
(45) Date of Patent: May 19, 2009

(54) COMBINATION WIRELESS COMMUNICATIONS DEVICE AND PORTABLE STEREO

(75) Inventor: William C. Ashman, Jr., Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 477 days.

(21) Appl. No.: 10/970,920

(22) Filed: Oct. 22, 2004

(65) Prior Publication Data
US 2006/0089170 A1    Apr. 27, 2006

(51) Int. Cl.
*H04M 1/02* (2006.01)
(52) U.S. Cl. .................... 455/556.1; 455/575.1
(58) Field of Classification Search ............ 455/575.1, 455/566, 556.1, 575.3, 575.6, 557, 347, 351, 455/66.1
See application file for complete search history.

(56) References Cited

U.S. PATENT DOCUMENTS

| | | | |
|---|---|---|---|
| 4,591,661 A * | 5/1986 | Benedetto et al. | 455/556.1 |
| 6,009,336 A * | 12/1999 | Harris et al. | 455/566 |
| 6,154,649 A | 11/2000 | Reichstein et al. | |
| 6,363,244 B1 * | 3/2002 | McGhee | 455/90.1 |
| 6,658,267 B1 | 12/2003 | Baranowski et al. | |
| 6,751,473 B1 * | 6/2004 | Goyal et al. | 455/556.1 |
| 6,812,954 B1 * | 11/2004 | Priestman et al. | 348/14.01 |
| 6,819,939 B2 * | 11/2004 | Masamura | 455/550.1 |
| 7,072,686 B1 * | 7/2006 | Schrager | 455/556.1 |
| 2001/0011993 A1 * | 8/2001 | Saarinen | 345/156 |
| 2002/0016191 A1 * | 2/2002 | Ijas et al. | 455/575 |
| 2002/0042287 A1 | 4/2002 | Asami | |
| 2003/0040286 A1 * | 2/2003 | Walter | 455/90 |
| 2003/0125075 A1 * | 7/2003 | Klovborg | 455/556 |
| 2003/0144034 A1 * | 7/2003 | Hack et al. | 455/566 |
| 2004/0023697 A1 | 2/2004 | Komura | |

(Continued)

FOREIGN PATENT DOCUMENTS

DE    100 32 233    1/2001

(Continued)

OTHER PUBLICATIONS

Nokia 6610 GSM Triband Mobile Phone Cell Phone FM Stereo Radio, http://www.newworldtelnet.com/Nokia_6610_GSM_triband_mobile_phone_cell_phone.htm, Oct. 18, 2004.

(Continued)

*Primary Examiner*—Blane J Jackson
(74) *Attorney, Agent, or Firm*—Coats & Bennett, P.L.L.C.

(57) ABSTRACT

A hand-held wireless communications device operates in a communications mode and a stereo mode. The device comprises a housing, a long-range transceiver within the housing to communicate with a base station in the communications mode, and a receiver within the housing to receive radio signals from a broadcast radio station when the device is in the stereo mode. The broadcast radio station may transmit, for example, AM or FM signals to the and-held device. A controller within the housing generates control signals to place the device in the communications mode and the stereo mode, and selectively controls a plurality of speakers to render audio signals as audible sound. The plurality of speakers includes a pair of longitudinally-spaced speakers disposed opposite each other on the housing of the hand-held device.

28 Claims, 4 Drawing Sheets

U.S. PATENT DOCUMENTS

| | | | |
|---|---|---|---|
| 2004/0253945 A1* | 12/2004 | Janik | 455/419 |
| 2005/0064919 A1* | 3/2005 | An et al. | 455/575.3 |
| 2005/0124387 A1* | 6/2005 | Ribeiro et al. | 455/566 |
| 2006/0046780 A1* | 3/2006 | Subramaniam et al. | 455/557 |
| 2007/0265031 A1* | 11/2007 | Koizumi et al. | 455/556.1 |

FOREIGN PATENT DOCUMENTS

| | | |
|---|---|---|
| GB | 2 358 990 | 8/2001 |
| GB | 2 360 182 | 9/2001 |
| WO | 96/39752 | 12/1996 |

OTHER PUBLICATIONS

Stereo FM Radio Handsfree HPR-20—Product home—FM Radio and Handsfree, http://www.sonyericsson.com/spg.jsp?cc=us&lc=en&ver=4000&template=pp1_loader&php=php1 100 . . . , Oct. 18, 2004.

K70i—Product home—Video recording—Camera VGA—Mobile phone—Sony Ericsson, http://www.sonyericsson.com/spg.jsp?cc=us&lc=en&ver=4000&template=pp1_loader&php=php1_101 . . . , Oct. 18, 2004.

\* cited by examiner

COMBINATION WIRELESS COMMUNICATIONS DEVICE AND PORTABLE STEREO

BACKGROUND

The present invention relates generally to wireless communications devices, and particularly to wireless communications devices capable of receiving commercially broadcast radio signals.

Wireless communications devices allow remote parties to communicate over a wireless communications network. As is known in the art, audio signals representative of a remote party's voice are received from a base station in the network and rendered as audible sound over a speaker disposed on the housing of the device. However, most wireless communications devices also incorporate a wide variety of functionality that compliments communications ability. Some manufacturers, for example, incorporate FM radios in their products. Still other manufacturers provide separate units having tuner circuitry that connect to the wireless communications device through an interface port. To hear commercially broadcast radio signals, such as those provided by an FM radio station, a user connects the tuner to the wireless communications device and tunes to the selected FM station. A control button on either the wireless communications device or the tuner allows the user to switch between an FM mode to listen to music, and a communications mode to answer/place incoming/outgoing calls.

Typically, manufacturers do not install high-quality speakers in their wireless communications devices. Rather, a single speaker is the norm. This may be due to factors such as cost, but usually, a single speaker suffices for conversational use because the user places the speaker proximate to his or her ear. Thus, for users to be able to enjoy stereo sound, conventional devices require a pair of headphones or external speakers connected to either the device or the separate unit. However, this means that the user is burdened with additional pieces of equipment and cabling, as well as the associated cost.

SUMMARY

The present invention allows both wireless communications and commercial radio reception using a hand-held wireless communications device. The hand-held device includes a housing, a controller, a long-range transceiver, a receiver, and a plurality of speakers. The controller, long-range transceiver, receiver, and plurality of speakers are disposed in the housing. The long-range transceiver communicates with a base station in a full-duplex mode over one or more cellular frequencies, while the receiver receives radio signals transmitted by a broadcast radio station over one or more radio frequencies. The radio frequencies may be, for example, AM/FM radio signals transmitted by AM/FM broadcast radio stations. At least two of the speakers are longitudinally-spaced and disposed at opposite ends of the hand-held device. A display connected to the housing of the hand-held device is extendable between a retracted position adjacent the housing, and an extended position.

The controller is configured to operate the hand-held wireless communications device in one or more operating modes. The operating modes include a communications mode, a stereo mode, a camera mode, a teleconferencing mode, and a karaoke mode. In the communications mode, the controller selectively enables at least one of the plurality of speakers and renders the audio signals received from the base station as audible sound. In the stereo mode, the controller enables each of the plurality of speakers and renders the radio signals as stereo sound. The controller may further generate control signals that switch the hand-held device between the communications and stereo modes. In one embodiment, the controller generates the control signals responsive to user input. In an alternate embodiment, the controller generates the control signals responsive to detecting an incoming call.

BRIEF DESCRIPTION OF THE DRAWINGS

FIG. 2 illustrates a possible environment that a wireless communications device configured according to the present invention may operate in.

DETAILED DESCRIPTION

Figure 1:
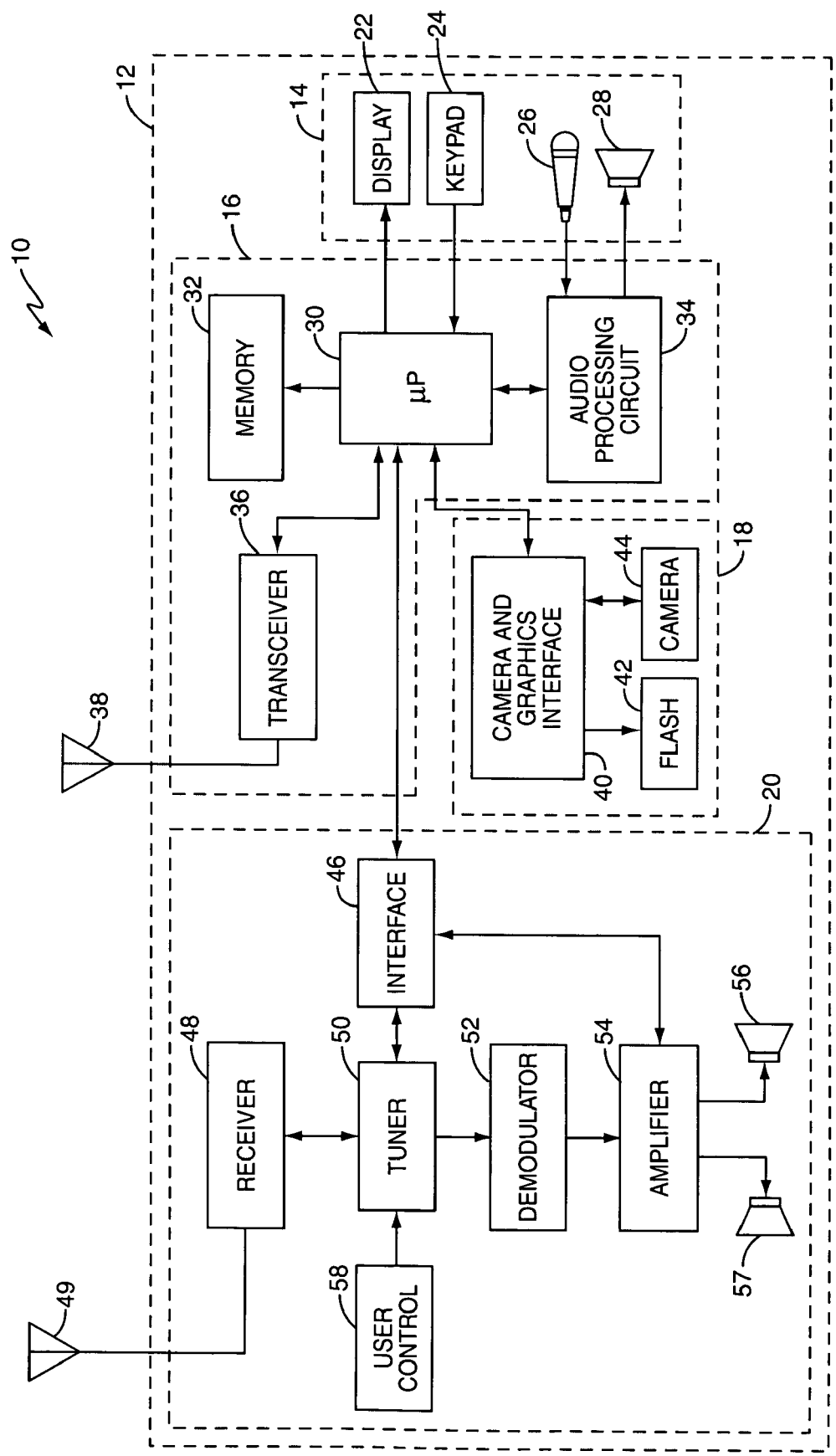
FIG. 1 is a block diagram of one embodiment of a wireless communications device configured according to the present invention.

Referring now to the drawings, FIG. 1 illustrates a hand-held camera-equipped wireless communications device 10 according to the present invention. While the figures illustrate device 10 in terms of a camera-equipped cellular telephone, those skilled in the art will readily appreciate that the present invention is applicable to any hand-held wireless communications device with or without media imaging capability including, but not limited to, Personal Digital Assistants (PDAs), cellular telephones, satellite telephones, Personal Communication Services (PCS) devices, palm computers, or the like.

As seen in FIG. 1, device 10 comprises a housing 12, user interface 14, communications circuitry 16, a camera assembly 18, and stereo receiver circuitry 20. User interface 14 includes a display 22, a keypad 24, a microphone 26, and a speaker 28, and provides a user with the necessary elements to interact with device 10. Display 22 permits users to view dialed digits, call status, menu options, and service information typically associated with wireless communications, as well as information usually associated with the reception and rendering of stereo sound, such as graphics and speaker balancing information. Display 22 also acts as a viewfinder when device 10 is in a camera mode and as a teleconferencing display when device 10 is in a teleconferencing mode. Additionally, display 22 may display the text of a song when device 10 is used in a karaoke mode.

Keypad 24, disposed on a face of device 10, includes an alphanumeric keypad and other input controls such as a joystick, button controls, or dials. Keypad 24 allows the operator to dial numbers, enter commands, and select options from menu systems, as well as control the operation of stereo circuitry 20, such as tuning a receiver to specific radio stations and volume control. Additionally, keypad 24 permits the user to control the functionality of camera assembly 18.

Microphone 26 converts the user's speech into electrical audio signals, and speaker 28 converts audio signals into audible sounds that can be heard by the user. Microphone 26 and speaker 28 may be any type of audio transducer known in the art. However, as described below in more detail, speaker 28 is capable of producing stereo sound in conjunction with one or more additional speakers 56, 57, depending upon the current operating mode of device 10.

Communications circuitry 16 comprises a controller 30, memory 32, an audio processing circuit 34, and a long-range transceiver 36 having an antenna 38. Memory 32 represents the entire hierarchy of memory in device 10, and may include both random access memory (RAM) and read-only memory (ROM). Computer program instructions and data required for operation of device 10 are stored in non-volatile memory, such as EPROM, EEPROM, and/or flash memory, and may be implemented as discrete devices, stacked devices, or integrated with controller 30. Memory 32 may also be used to store information regarding the operation of stereo circuitry 20, such as preprogrammed commercial radio frequencies for broadcast radio stations.

Controller 30 controls the operation of device 10 according to programs stored in memory 32, and may use known techniques to digitally alter images captured by camera assembly 18. The control functions may be implemented, for example, in a single microprocessor, or in multiple microprocessors. Suitable microprocessors may include, for example, both general purpose and special purpose microprocessors and digital signal processors. Controller 30 may interface with audio processing circuit 34, which provides basic analog output signals to speaker 28 and receives analog audio inputs from microphone 26. Controller 28 may also control the operation of camera assembly 18 responsive to control signals input by the user on keypad 24, for example. In addition, controller 30 may generate one or more control signals to control the operation of stereo circuitry 20. This includes, but is not limited to, volume control, tuning control, and equalizer functionality.

Transceiver 36 is coupled to antenna 38 for receiving and transmitting cellular signals from and to one or more base stations in a wireless communications network. Transceiver 36 is a fully functional cellular radio transceiver, and operates according to any known standard, including Global System for Mobile Communications (GSM), TIA/EIA-136, cdmaOne, cdma2000, UMTS, and Wideband CDMA.

Camera assembly 18 includes a camera and graphics interface 40, a camera 44, and an optional integrated flash 42. Camera assembly 18 may be any camera assembly known in the art, and may further include such elements as a lens assembly (not shown), an image sensor (not shown), and an image processor (not shown). Camera and graphics interface 40 interfaces camera assembly 18 with controller 30. As is known in the art, an image processor (not shown) may be interposed between camera and graphics interface 40 and camera 44 and/or flash device 42 to control camera 44 and/or flash device 42 and process images. While the camera and graphics interface 40 is shown as a separated component in FIG. 1, it should be understood that camera and graphics interface 40 might be incorporated with the image processor or controller 30.

Camera assembly 18 captures images that can be digitized and stored in memory 32, digitally altered by controller 30, output to display 22, or transmitted over a wireless network via transceiver 36. Camera assembly 18 may be used to capture still images, video, or both. Flash device 42 emits a flash of light to illuminate, if required, the subject of the image being captured. Flash device 42 may be integrated with device 10, or alternatively, may be a peripheral device coupled to device 10 via a system interface port (not show) typically provided with wireless communications devices.

Stereo circuitry 20 may be any circuitry known in the art capable of receiving radio signals broadcast from one or more commercial broadcast radio stations, such as an FM radio station for example, and rendering the received signals as stereo sound to the user. Stereo circuitry 20 may be, for example, the type of circuitry typically found in portable stereo devices commonly known as "boom boxes." Stereo circuitry 20 comprises an interface circuit 46, a receiver 48 connected to an antenna 49, a tuner 50, a demodulator 52, an amplifier 54, and one or more speakers 56, 57.

Interface circuitry 46 comprises hardware and/or software components, and interfaces stereo circuitry 20 with controller 30. As described in more detail below, controller 30 can control various operating parameters of stereo circuitry 20, such as frequency tuning, speaker volume, and operating mode of device 10, by sending one or more control signals to interface 46. Interface 46, in turn, forwards the control signals to the appropriate component in stereo circuitry 20. Likewise, components included in stereo circuitry 20 may also send return signals or request signals to controller 30. Interface 46 may be a processor, for example, that is separate from controller 30, or may be circuitry integrated with controller 30.

Receiver 48 receives signals broadcast by a remote station via antenna 49. For example, the remote station may be a publicly or privately owned broadcast radio station external to the wireless communications network, such as an AM and/or FM radio station. The radio signals broadcast by the remote station are typically modulated sine waves that carry information representative of music, text, images, or audio, however, the sine waves may also carry other types of information. For the receiver 48 to receive the radio signals broadcast from a particular broadcast radio station, receiver 48 must be tuned to the particular transmit frequency used by broadcast radio station.

Receiver 48 is typically tunable via tuner 50. Tuner 50 may use a resonance circuit to separate a radio signal of interest from the thousands of radio signals that permeate the environment. For example, the tuner 50 may tune receiver 48 to a radio frequency of an FM radio station, such as 96.1 MHz, or it may tune receiver 48 to a radio frequency used by an AM radio station, such as 680 KHz. In these cases, tuner 50 will select only those radio signals being transmitted at 96.1 MHz or 680 KHz, respectively. All other radio signals received by device 10 will be ignored.

Tuner 50 may be controlled by the user via keypad 24 and controller 30, or may be controlled using a separate user control 58 such as an external knob. In one embodiment, the user controls which frequency receiver 48 is tuned for by entering a desired frequency directly into keypad 24. Controller 30 sends a control signal to tuner 50 via interface 46 responsive to the frequency input by the user. Additionally, one or more frequencies may be stored in memory 32, each with an associated identifier that uniquely identifies a specific commercial broadcast radio station. In these cases, the user might simply traverse one or more menu items or press a preconfigured sequence of keys on keypad 24 to select a desired broadcast radio station. Controller 30 would read the selected frequency from memory 32, and generate and send appropriate control signals to the tuner 50 via interface 46 to tune receiver 48 to the transmit frequency of the selected broadcast radio station. In another embodiment, the user operates the user control 58 to select a frequency band (e.g., AM or FM), and/or to tune the receiver 48 through a range of available frequencies. Tuner 50 may be part of receiver 48, integrated with interface 46 and/or controller 30, or it may be a separate component.

Demodulator 52 demodulates the received signal and extracts the desired information from the sine wave. For an AM transmitted signal, the demodulator 52 extracts the music, voice, images, or text carried by the received sine wave. For an FM transmitted signal, demodulator 52 detects small variations in the received FM signal, and converts them to audible sound. Whichever type of demodulator 52 is employed, amplifier 54 amplifies the demodulated signal for the user. The amplified signal is then output to the user via one or more speakers 56, 57. The controller 30 can send one or more control signals to interface 46 to control amplifier 54 to increase/decrease/mute the volume output by speakers 56, 57 responsive to user input.

It should be understood that speaker 28 and speakers 56, 57 might be controlled separately by their respective circuits, or might be commonly controlled by controller 30. In one embodiment, controller 30 keeps track of what mode device 10 is currently operating in, and selectively enables/disables appropriate speakers 28, 54 accordingly. For example, in the communications mode, controller 30 may output all audio signals to speaker 28. In stereo mode or teleconferencing mode, controller 30 may output audio signals to the plurality of speakers 56, 57 as well as speaker 28. In doing so, device 10 can provide stereo sound for the user.

Figure 2:
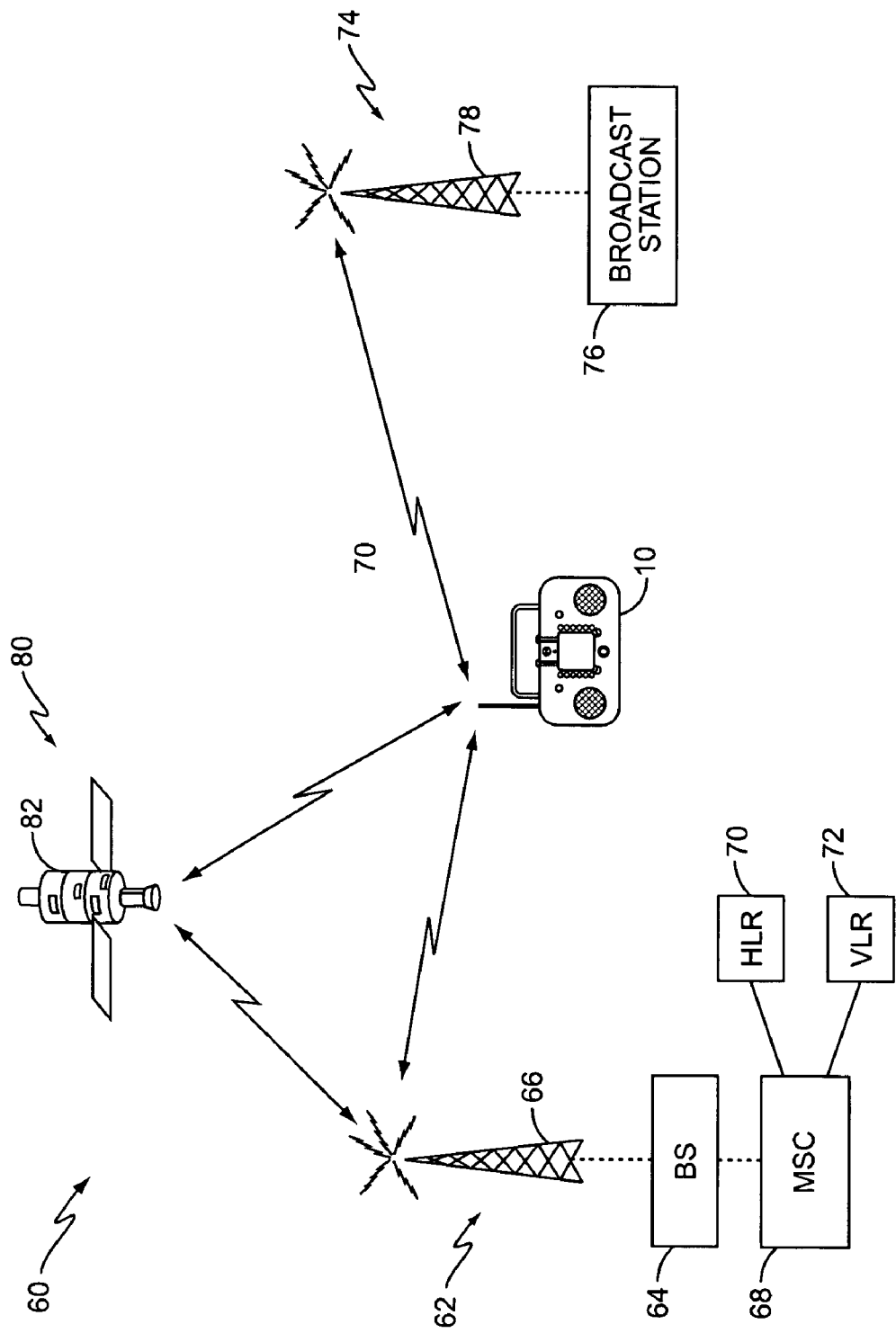

FIG. 2 illustrates one embodiment of a typical environment in which device 10 may operate. The environment may comprise a single network or more than one network and/or type of network; however, the broad spectrum of networks is referred to herein as network 60 for clarity.

FIG. 2 illustrates a network 60 that includes a cellular network 62 and a satellite communications network 80. A broadcast network 74 is also present, but may be external to network 60. Cellular network 62 illustrates a typical arrangement of a cellular communications network, and comprises one or more base stations (BS) 64 connected to a mobile switching center (MSC) 68. Each BS 64 may include one or more antennas 66, and provides cellular services to device 10 over a specified geographic region known as a cell. BS 64 facilitates communications between the user of device 10 and a remote party, and transmits control signals to device 10. These signals may include, for example, ephemeris data from satellites and updates or responses to location requests from device 10. MSC 68 routes calls to and from device 10 through BS 64, and communicates with a Home Location Register (HLR) 70 and a Visitors Location Register (VLR) 72. HLR 70 and VLR 72 store information concerning the location and activity status of device 10, and may or may not be co-located or integrated with MSC 68.

Broadcast network 74 comprises a commercial broadcast radio station 76 coupled to one or more antennas 78. Broadcast radio station 76 typically comprises a transmitter (not shown) that transmits radio signals in all directions. The broadcast radio station 76 may be any publicly or privately owned radio station that broadcasts radio signals over commercial radio frequencies for reception by the public at large. For example, broadcast radio station 76 may be an FM broadcast station, or an AM broadcast station that transmits FM and AM radio signals, respectively. Signals in the FM frequency band are typically transmitted at a frequency between 88 MHz and 108 MHz, while signals in the AM radio band are typically transmitted at a frequency between 535 KHz and 1.7 MHz. As previously stated, the user of device 10 may tune stereo circuitry 20 to receive any of the signals transmitted over either of these frequency bands.

Satellite network 80 comprises a satellite 82, and transmits radio signals from earth orbit. Satellite network 80 may be used to transmit positioning coordinates (e.g., GPS), or may be used as part of a communications network for device 10 (e.g., satellite communications systems). Additionally, satellite network 80 may transmit signals containing music, voice, text, or images, to device 10. This is commonly known as satellite radio and may be received by stereo circuit 20 by tuning receiver 48 to a frequency in the GHz range. As is known in the art, satellite network 80 may interact with cellular communications network 62 and/or broadcast network 74 to provide music and other information to the user of device 10.

As previously stated, device 10 is operable in one or more modes. These include, but are not limited to, a cellular telephone mode, a teleconferencing mode, a karaoke mode, a stereo mode, and a camera mode. The user may be able to enable/disable these modes of operation and/or switch between modes of operation simply by using keys of keypad 24. In one embodiment of the present invention, controller 30 enables or disables selected speakers 28, 56, and 57 depending upon the current operating mode of the device 10.

Figure 3:
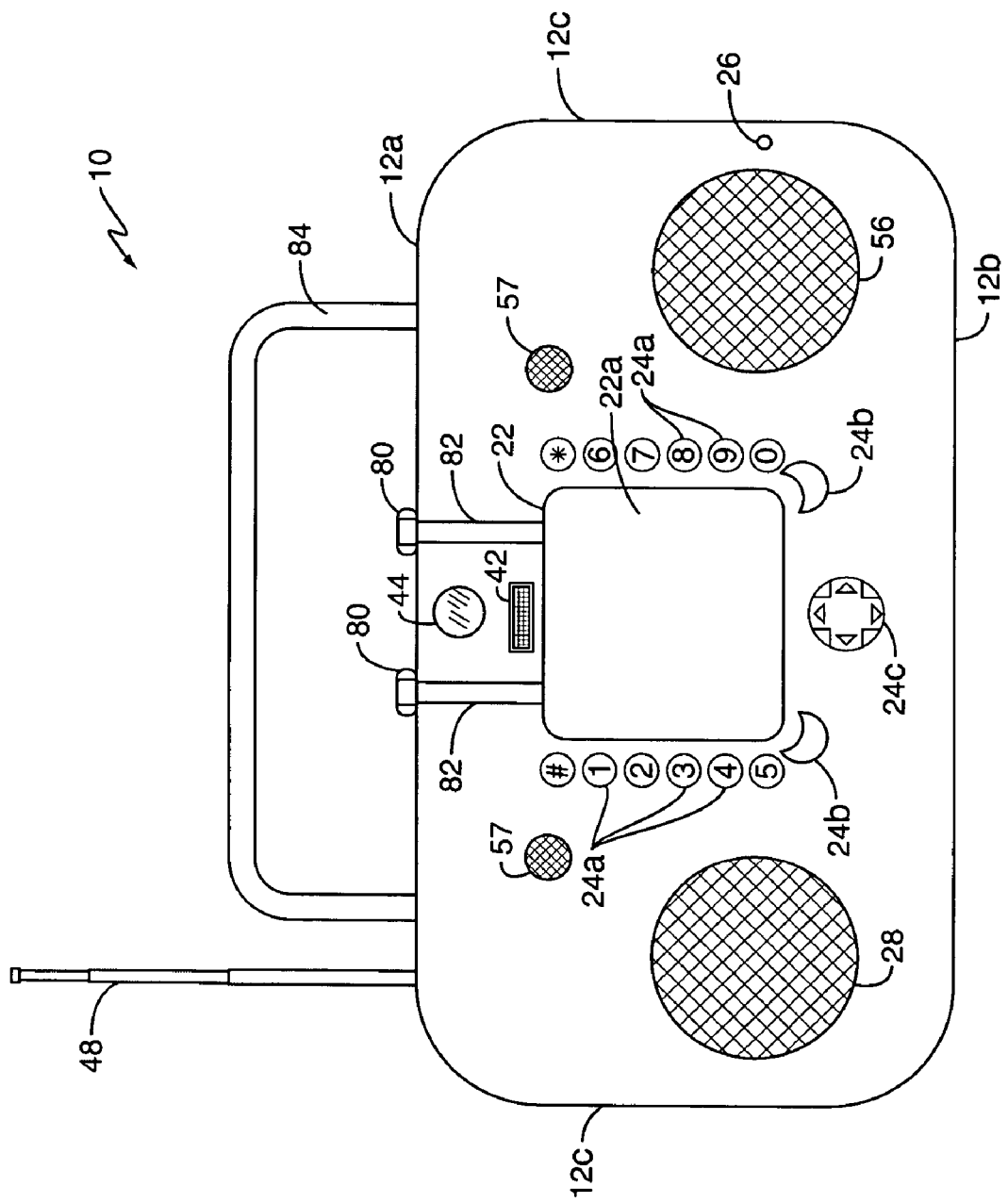
FIG. 3 is a perspective view of one embodiment of the present invention configured for a communications/boom box mode.

FIG. 3 illustrates a perspective view of device 10 configured for operation in the cellular telephone mode. Particularly, housing 12 is shaped generally to resemble a "boom box" or portable stereo, and comprises a top end 12a, a bottom end 12b, and two side ends 12c. The bottom end 12c comprises a substantially flat surface to stabilize device 10 when device 10 is placed on a tabletop or other surface. A handle 84 may be attached to housing 12 to allow a user to carry device 10. Keys 24a, 24b may be used to dial the number of a remote party for an outgoing call, accept an incoming call from network 62, or select various menu items on display 22. Navigation disk 24c may be used to invoke and/or navigate menu options, for example, displayed on display 22. In this embodiment, display 22 is positioned such that a display face 22a faces the user. In this position and in this mode, display 22 can be used to display the menu items, dialed digits, caller ID information, and other data typically associated with wireless communications.

The plurality of speakers 28, 56, and 57 on the housing 12 of device 10 are longitudinally-spaced. In this embodiment, speakers 28 and 56 are disposed at opposite ends of a longitudinal axis of device 10. Speakers 28 and 56 may be, for example, woofers that produce low frequency audible sound. Likewise, speakers 57 are also longitudinally-spaced. Speakers 57 may be tweeters, for example, that produce high frequency audible sound. Display 22 is in a retracted position, and positioned such that speakers 28, 56, and 57 are on either side of display 22. As seen in FIG. 3, placement of the speakers 28, 56, and 57 facilitates the production of stereo sound. Additionally, keys 24a, 24b are positioned proximate the edge of display 22 when display 22 is in the retracted position.

As stated previously, controller 30 may generate control signals to enable/disable selected ones of the speakers 28, 56, and 57 depending upon the operating mode of the hand-held device 10. In one embodiment, controller 30 places device 10 in the communications mode responsive to user actuation of one or more keys on keypad 24. In this mode, controller 30 may disable or mute speakers 56, 57, and instead enable only speaker 28. The user can then hold device 10 to his or her ear and listen to a remote party over the single speaker 28. The user's voice signals, detected by microphone 26, are transmitted to the remote party via cellular network 62 as is known in the art.

Likewise, controller 30 may also generate a control signal to place device 10 into the stereo mode. For example, the user may place device 10 into a stereo mode by selecting the mode from a menu displayed on display 22. The user may then enter a desired frequency or the call letters identifying a desired radio station. Alternatively, the user may select a radio station or frequency from a pre-configured list stored in memory 32. Responsive to this input, controller 30 would generate control signals to tune receiver 48 to the selected frequency, and to enable speakers 28, 56, and 57. Upon receiving the radio signals, controller 30 could then render the radio signals as stereo sound through speakers 28, 56, and 57.

If the user wishes to return to the communications mode, the user needs merely to actuate any key on keypad 24. Alternatively, controller 30 might detect an incoming call, and automatically generate the control signal to place device 10 into the communications mode. In one embodiment, controller 30 renders an audible alert to let the user know that device 10 has received an incoming call. The user may then select whether or not to accept the call, thus returning device 10 to the communications mode.

To assist the user in maintaining a balanced load on speakers 28, 56, and 57 a graphical representation of the audio output may be displayed to the user on display 22 in addition to/in place of other information. For example, in one embodiment of the present invention, controller 30 periodically samples the output of amplifier 54. Responsive to the sampling, and to user-defined parameters, controller 30 controls display 22 to display a graphical output that is similar to that provided by a graphical equalizer. Using the equalization information, the user can optimize one or more components of stereo circuitry 20.

While the preceding discussion has centered on the communications and stereo modes, those skilled in the art will appreciate that the present invention is not so limited. In one configuration, for example, device 10 is capable of a teleconferencing mode. In this mode, the user places the bottom end surface 12b on a table or other suitable surface. Controller 30 generates control signals responsive to the user input that enables/disables selected ones of speakers 28, 56, and 57. However, it should be noted that controller 30 may output the remote user's voice as stereo sound in this mode. Display 22 displays the images of the remote party with whom the user is speaking, while camera 44 and microphone 26 captures images and the voice of the user, respectively, for transmission to the remote party.

In another configuration, the user may use keys 24a to place device 10 into a karaoke mode. This mode permits the user to sing in a karaoke-like manner having his or her voice recorded on device 10 for later playback, or alternatively, transmitted live to one or more remote parties via network 60. In this mode, receiver 48 is tuned to the particular transmit frequency for broadcast radio station 76 responsive to control signals from controller 30. Display face 22 is in the retracted position, such that the display 22a faces the user. This permits the user to view the words to a particular song. Controller 30 also enables speakers 28, 56, and 57, and renders the received radio signals through speakers 28, 56, and 57 as stereo sound. When the camera 44 and/or transceiver 36 are active, the user can transmit their voice and/or video images to one or more remote parties.

The words to a particular song may be stored in memory, or transmitted by broadcast radio station 76. If broadcast radio station 76 is equipped to transmit the text of the song being played, controller 30 would extract the words to the song and display them to the user on display 22, while controlling speakers 28, 56, and 57 to output the music as stereo sound. Timing signals may or may not be transmitted by the broadcast station 76 to enable controller 30 to synchronize the words with the music being played.

Figure 4:
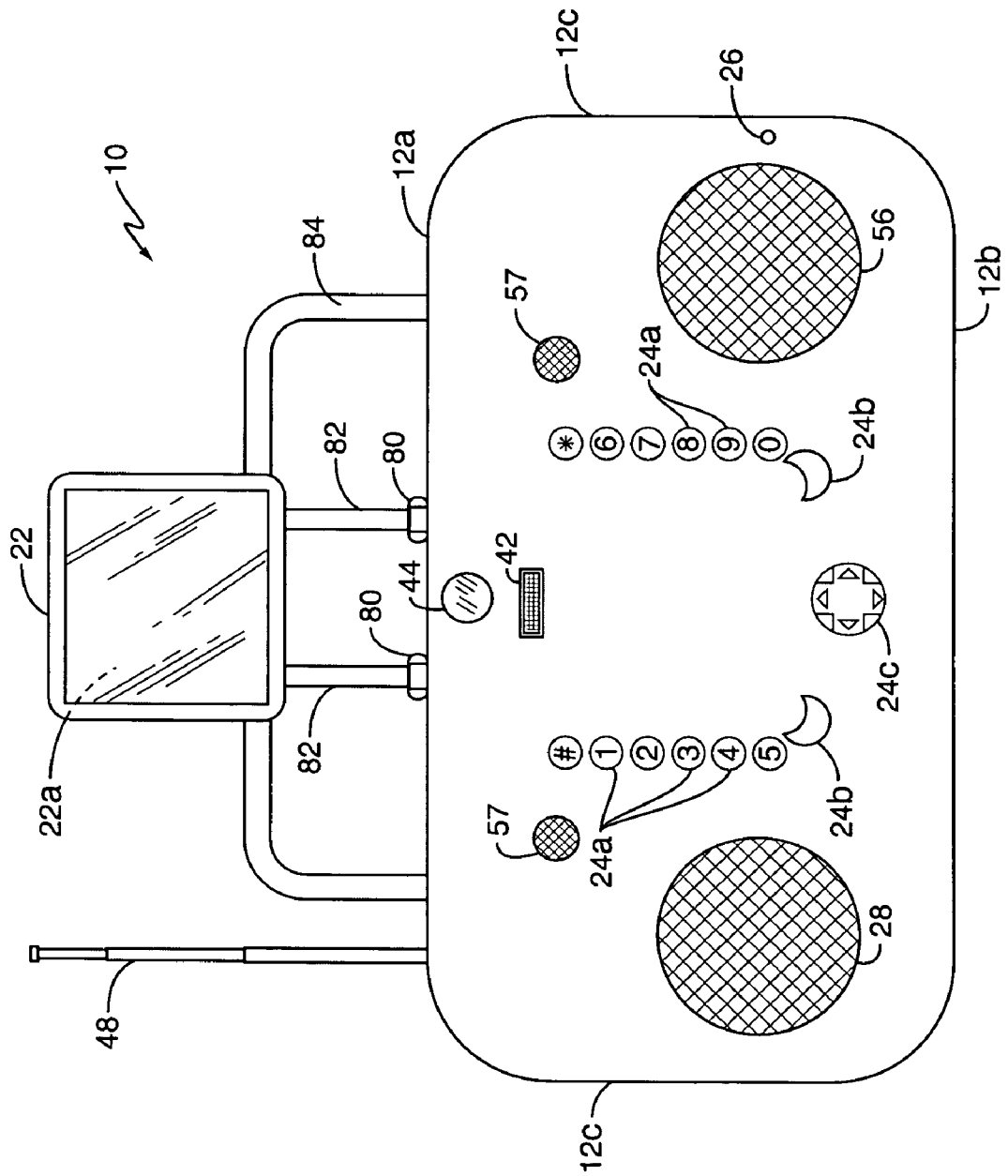
FIG. 4 is a perspective view of one embodiment of the present invention configured for a camera mode.

In a camera mode, seen in FIG. 4, device 10 may be operated as a camera to capture images. In this mode, a pair of rotatable hinges 80 disposed on housing 12 permit display 22 to be extended into an extended position from the retracted position against housing 12. In the extended position, display face 22a is facing the rear of device 10 such that the user can use display 22 as a viewfinder. Any of the keys 24a of keypad 24 may be used to capture and save the image in memory 32 as is known in the art. Flash 42 may be used to illuminate a subject if desired. Because device 10 may include a handle 84, display 22 may be disposed on one or more extendable telescoping legs 82 that can be adjusted by the user to optimize the height of display 22.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of rendering audible sound to a user of a hand-held wireless communications device, the method comprising:
   receiving, in a communications mode, communication signals from a base station in a wireless communications network on a long-range transceiver disposed in a housing of a hand-held wireless communications device;
   receiving, in a stereo mode, radio signals from a broadcast radio station on a receiver disposed in the housing of the hand-held wireless communications device;
   selective enabling first and second longitudinally-spaced speakers disposed in the housing at opposite ends of the hand-held wireless communications device to render the received radio signals as audible sound when the hand-held device is in the stereo mode;
   selectively enabling third and fourth speakers disposed in the housing of the hand-held wireless communications device when the hand-held device is in the stereo mode, and rendering the radio signals through the enabled speakers as stereo sound;
   disabling the second speaker when the hand-held wireless communications device is in the communications mode, the second speaker being disposed proximate a microphone;
   sampling the received radio signals; and
   balancing a load on the first, second, third, and fourth speakers based on the sampled signals when the device is in the stereo mode.

2. The method of claim 1 further comprising generating a control signal to place the hand-held device in the communications mode.

3. The method of claim 2 wherein the control signal is generated responsive to user input.

4. The method of claim 2 wherein the control signal is generated responsive to detecting an incoming call.

5. The method of claim 1 further comprising generating a control signal to place the hand-held device in the stereo mode.

6. The method of claim 5 wherein the control signal is generated responsive to the selection of a frequency associated with the broadcast radio station.

7. The method of claim 1 further comprising rendering the radio signals through the first and second speakers as stereo sound.

8. The method of claim 1 wherein the first and second speakers render low frequency sound, and the third and fourth speakers render high frequency sound.

9. The method of claim 1 further comprising displaying a graphical representation of a load on one or more of the first, second, third, and fourth speakers when the hand-held device is in the stereo mode.

10. The method of claim 1 further comprising extending a display connected to the hand-held wireless communications device from a retracted position to an extended position.

11. A hand-held wireless communications device comprising:
- a housing that includes:
  - communication circuitry to communicate with one or more base stations in a wireless communications network;
  - stereo circuitry to receive radio signals from a broadcast radio station;
  - a first pair of longitudinally-spaced speakers to render the received radio signals as stereo sound to a user;
  - a second pair of longitudinally-spaced speakers; and
  - a display movable between a retracted position and an extended position, wherein the display is positioned between each speaker in the first pair of speakers when the display is in the retracted position.

12. The hand-held wireless communications device of claim 11 further comprising:
- a microphone in the housing; and
- a controller configured to:
  - sample the received radio signals; and
  - balance a load on the first and second pairs of longitudinally-spaced speakers based on the sampled signals when the device is in a stereo mode.

13. The hand-held device of claim 12 wherein the controller is further configured to generate a first control signal to switch the hand-held communications device between a communications mode and the stereo mode.

14. The hand-held device of claim 13 wherein the controller generates the first control signal responsive to user input.

15. The hand-held device of claim 13 wherein the controller automatically generates the first control signal responsive to detecting an incoming call.

16. The hand-held device of claim 13 wherein the stereo circuitry comprises a tuner, and wherein the controller generates a second control signal to tune the tuner to a radio frequency associated with the selected broadcast radio station.

17. The hand-held device of claim 16 further comprising memory within the housing to store the frequency associated with the selected broadcast radio station.

18. The hand-held device of claim 13 wherein the controller is configured to enable and disable selected ones of the first and second pairs of longitudinally-spaced speakers based on whether the hand-held device is in the communications mode or the stereo mode.

19. The hand-held device of claim 13 wherein the display displays the image of one or more remote parties when the hand-held device is in the communications mode.

20. The hand-held device of claim 13 wherein one speaker in the first pair of longitudinally-spaced speakers is enabled and the other speaker in the first pair of longitudinally-spaced speakers is disabled when the hand-held device is in the communications mode.

21. The hand-held device of claim 12 wherein the controller is further configured to:
- generate equalization information for display to the user based on the sampled signals; and
- balance the load on the first and second pairs of longitudinally-spaced speakers based on the equalization information responsive to user input.

22. The hand-held device of claim 12 wherein the display displays a graphical representation of the load on the first and second pairs of longitudinally-spaced speakers when the hand-held device is in the stereo mode.

23. The hand-held device of claim 12 wherein the first pair of longitudinally-spaced speakers produces low frequency sound.

24. The hand-held device of claim 23 wherein the second pair of speakers produces high frequency sound.

25. The hand-held device of claim 12 wherein the first and second pairs of longitudinally-spaced speakers are enabled to produce stereo sound.

26. The hand-held device of claim 11 wherein the display attaches to the housing via one or more rotatable hinges.

27. The hand-held device of claim 11 wherein the display comprises one or more telescoping legs that permit a user to adjust the height of the display when the display is in the extended position.

28. The device of claim 11 further comprising a handle attached to the housing.

* * * * *